(12) United States Patent
Cartwright

(10) Patent No.: US 12,181,332 B2
(45) Date of Patent: Dec. 31, 2024

(54) WEIGHING APPARATUS AND METHOD

(71) Applicant: ILLINOIS TOOL WORKS INC., Glenview, IL (US)

(72) Inventor: Kevin Roy Cartwright, Birmingham (GB)

(73) Assignee: ILLINOIS TOOL WORKS INC., Glenview, IL (US)

( * ) Notice: Subject to any disclaimer, the term of this patent is extended or adjusted under 35 U.S.C. 154(b) by 607 days.

(21) Appl. No.: 17/355,657

(22) Filed: Jun. 23, 2021

(65) Prior Publication Data
US 2022/0003594 A1    Jan. 6, 2022

(30) Foreign Application Priority Data

Jul. 1, 2020   (GB) ...................................... 2010055
May 28, 2021  (EP) .................................... 21176743

(51) Int. Cl.
| | |
|---|---|
| G01G 19/414 | (2006.01) |
| G01G 19/08 | (2006.01) |
| G01G 23/18 | (2006.01) |
| G06F 3/04847 | (2022.01) |
| G06Q 10/087 | (2023.01) |
| G06Q 20/20 | (2012.01) |
| G06Q 30/0601 | (2023.01) |

(52) U.S. Cl.
CPC ......... *G01G 19/4144* (2013.01); *G01G 19/08* (2013.01); *G01G 23/18* (2013.01); *G06Q 10/087* (2013.01); *G06Q 30/0623* (2013.01); *G06F 3/04847* (2013.01); *G06Q 20/201* (2013.01); *G06Q 20/208* (2013.01)

(58) Field of Classification Search
CPC .... G01G 19/4144; G01G 19/08; G01G 23/18; G01G 19/52; G01G 19/387; G06Q 10/087; G06Q 30/0623; G06Q 20/201; G06Q 20/208; B62B 5/0096; B62B 3/002; B62B 3/14; G06F 3/04847
USPC ............................................................. 177/1
See application file for complete search history.

(56) References Cited

U.S. PATENT DOCUMENTS

| | | | |
|---|---|---|---|
| 6,725,206 B1 * | 4/2004 | Coveley ............. | G01G 19/4144 705/16 |
| 9,305,201 B2 * | 4/2016 | Barten ................... | G01G 21/30 |
| 9,443,222 B2 * | 9/2016 | Singel ................ | G06K 17/0022 |
| 10,384,703 B2 * | 8/2019 | Green ................. | G06Q 20/208 |

(Continued)

FOREIGN PATENT DOCUMENTS

| | | |
|---|---|---|
| CN | 206307059 U | 7/2017 |
| EP | 3578934 A1 | 12/2019 |

(Continued)

*Primary Examiner* — Jacques M Saint Surin
(74) *Attorney, Agent, or Firm* — THOMPSON HINE LLP

(57) ABSTRACT

A trolley includes a weighing balance mounted on the trolley and configured to weigh at least one item placed on the weighing balance; a display; a communication module configured to receive order data indicative of an order including one or more items, wherein at least one of the items is defined by weight; a memory configured to store the order data; a processor configured to: control the display to output an indication of at least some of the one or more items, determine a weight of one of the items defined by weight placed on the weighing balance, and control the display to output the determined weight of the at least one item from the weighing balance on the display.

20 Claims, 8 Drawing Sheets

(56) References Cited

U.S. PATENT DOCUMENTS

| | | | |
|---|---|---|---|
| 2016/0203543 A1* | 7/2016 | Snow | G06Q 30/0635 |
| | | | 705/26.81 |
| 2017/0161703 A1* | 6/2017 | Dodia | G07G 1/0072 |
| 2018/0218351 A1 | 8/2018 | Chaubard | |
| 2019/0073656 A1 | 3/2019 | Bentsur | |
| 2019/0279185 A1 | 9/2019 | Cheng | |
| 2021/0117950 A1* | 4/2021 | Bentsur | G01G 19/08 |

FOREIGN PATENT DOCUMENTS

| | | | |
|---|---|---|---|
| JP | H11292225 A | 10/1999 | |
| WO | WO 2020034883 A1 | 2/2020 | |

\* cited by examiner

| | Weight (g) | Determined Weight (g) | Quantity |
|---|---|---|---|
| 401a — Carrots | 200 | 220 | |
| 405a — Beans | | | 3 |
| 405b — Ice Cream | | | 1 |
| 401b — Bananas | 400 | | |

| | Weight (g) | Determined Weight (g) | Quantity |
|---|---|---|---|
| 405a — Beans | | | 3 |
| 405b — Ice Cream | | | 1 |
| 401b — Bananas | 400 | | |
| 401c — Onion | 750 | | |

WEIGHING APPARATUS AND METHOD

BACKGROUND

There are two forms of shopping available to consumers: 'in-person' shopping and online shopping. 'In-person' shopping is when a user visits a store to pick their own items. Online shopping involves ordering items for collection at a later time at a store or locker collection, or home delivery.

When an order placed through online shopping is received, the items from the order must be picked by a 'picker'. The picker moves around a store or warehouse to retrieve items to fulfil the order. In a situation where the items are picked by picker working in a store during store opening hours, there are 'in-person' shoppers completing their own shopping while the picker is retrieving the items to fulfil the order. In other scenarios, the picker may move around a 'dark store' which is not open to 'in-person' shoppers but has many 'pickers' working to fulfil orders. Some items in the order may be defined by weight and other items may be defined by quantity. For example, fresh fruit and vegetables are often defined by weight (e.g. 200 g carrots) and ice cream is defined by quantity (1 tub of ice cream).

In a store or warehouse, there is often a small number of weighing balances at fixed locations throughout the store or warehouse which are available to customers and pickers to weigh out the items defined by weight. Due to space constraints, the number of weighing balances are limited. There is often a conflict when two users, such as two pickers or a picker and an 'in-person' shopper want to use the weighing balance at the same time, particularly during busy periods. When the picker waits for another picker or an 'in-person' shopper to use the weighing balance, they are not able to retrieve other items in the order and therefore the efficiency of the picker is reduced.

Furthermore, when a fixed location weighing balance is used, the user of the weighing balance is required to carry the items defined by weight to the weighing balance, select and weigh the item defined by weight and collect a printed label corresponding to a determined weight of the item defined by weight and price information. In the case of a 'picker', before placing the item in the trolley. the picker must scan the printed label using a scanner on the trolley. In the case of an 'in-person' shopper, the 'in person' shopper must scan the printed label at a paying point, such as a check out.

It is an object of embodiments of the invention to at least mitigate one or more of the problems of the prior art.

SUMMARY

According to an embodiment of the invention there is provided a trolley comprising: a weighing balance mounted on the trolley and configured to weigh at least one item placed on the weighing balance; a display; a communication module configured to receive order data indicative of an order comprising one or more items, wherein at least one of the items is defined by weight; a memory configured to store the order data; a processor configured to: control the display to output an indication of at least some of the one or more items, determine a weight of one of the items defined by weight placed on the weighing balance, and control the display to output the determined weight of the at least one item from the weighing balance on the display.

Optionally, the processor is configured to associate the determined weight of the at least one item from the weighing balance with a corresponding item defined by weight from the order data.

In some embodiments, the processor may be configured to determine whether the determined weight meets a required weight of the corresponding item defined by weight.

The processor may be configured to control the display to output a second indication when the determined weight meets a required weight of the corresponding item defined by weight.

Optionally, the memory is configured to store data of the at least one item from the weighing balance with the corresponding item defined by weight from the order data.

The trolley may comprise an input device configured to receive at least one user input. In some embodiments, the at least one user input may comprise a first user input indicative of a user selection of the item defined by weight placed on the weighing balance and the processor may be configured to control the display to output an indication of the item defined by weight corresponding to the user selection in dependence on the first user input. In some embodiments, the at least one user input may comprise a second user input and the processor may be configured to control the display to output the indication of the at least some of the one or more items in dependence on the second user input.

Optionally, the trolley is associated with a means for determining that an item defined by quantity is placed on the trolley.

Optionally, the display may be mounted on the trolley. The weighing balance and the display may be implemented on a common device. The communication module may be configured to communicate via wireless communication.

According to an embodiment of the invention, there is provided a method comprising: receiving, by a communication module, order data indicative of an order comprising one or more items, wherein at least one of the items is defined by weight; storing the order data in a memory; controlling a display to output an indication of at least some of the one or more items, determining a weight of one of the items defined by weight placed on a weighing balance, and controlling the display to output the determined weight of the at least one item from the weighing balance on the display, wherein the weighing balance is mounted on a trolley and configured to weigh at least one item placed on the weighing balance.

Optionally, the method may comprise associating the determined weight of the at least one item from the weighing balance with a corresponding item defined by weight from the order data.

Optionally, the method may comprise determining pricing information of the at least one item placed on the weighing balance.

In some embodiments, the method may comprise determining whether the determined weight meets a required weight of the corresponding item.

Optionally, the method comprises controlling the display to output a second indication when the determined weight meets a required weight of the corresponding item.

In some embodiments, the method comprises storing, in the memory, data of the at least one item from the weighing balance with the corresponding item defined by weight from the order data.

The method may comprise receiving at least one user input via an input device. Optionally, the at least one user input may comprise a first user input indicative of a user selection of the item defined by weight placed on the weighing balance and the method may comprise controlling the display to output an indication of the item defined by weight corresponding to the user selection in dependence on the first user input. In some embodiments, the at least one user input comprises a second user input and the method may comprise controlling the display to output the indication of the at least some of the one or more items in dependence on the second user input.

BRIEF DESCRIPTION OF THE DRAWINGS

Embodiments of the invention will now be described by way of example only, with reference to the accompanying figures, in which:

FIG. 3B shows a display according to an embodiment of the present invention;

FIG. 3C shows a display according to an embodiment of the present invention;

DETAILED DESCRIPTION OF EMBODIMENTS

The present invention relates to apparatus and methods for retrieving items for an order, wherein at least one of the items of the order is defined by weight. Embodiments of the method may be performed by embodiments of the apparatus as will be described in more detail below.

Figure 1:
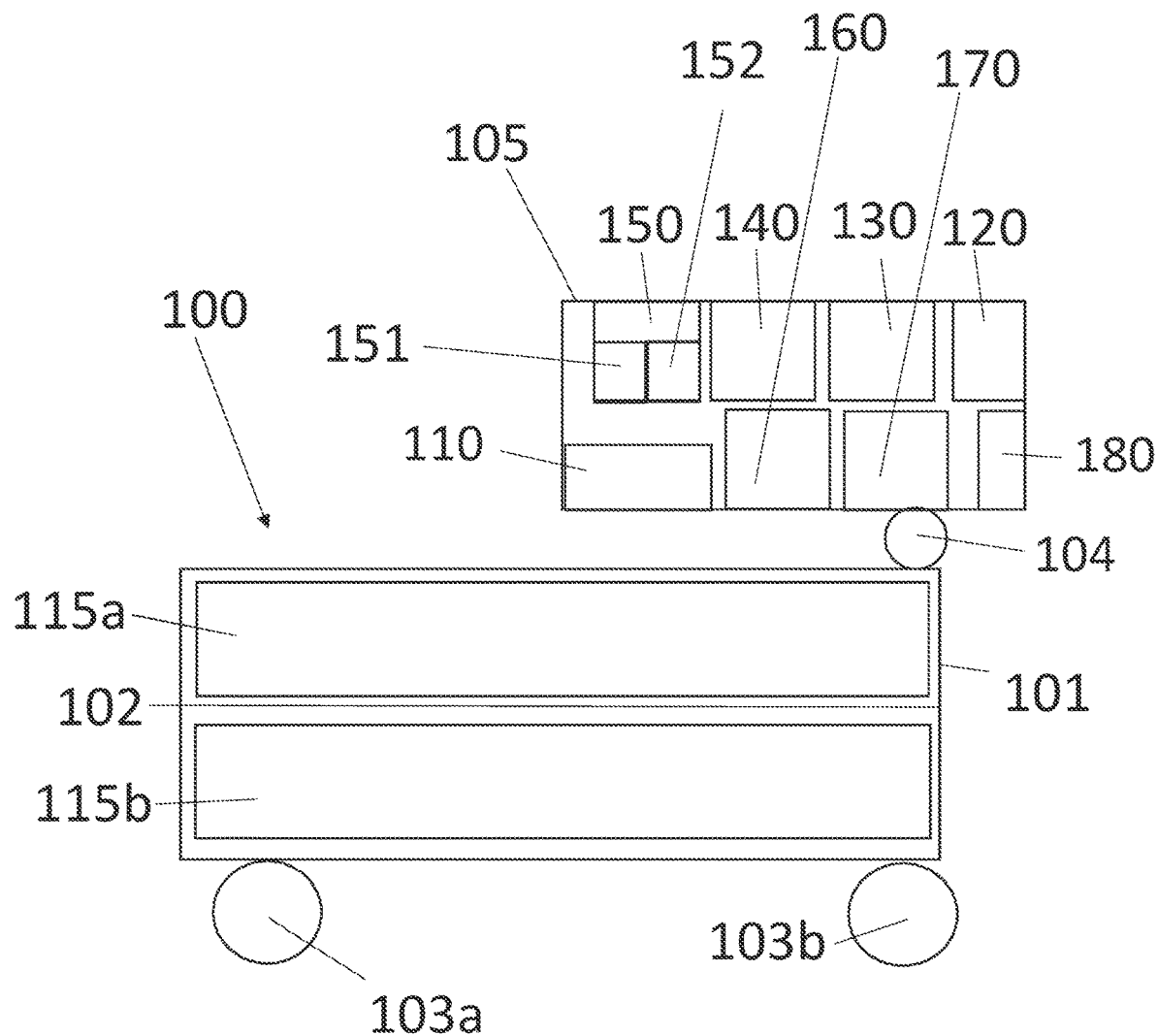
FIG. 1 shows a trolley according to an embodiment of the present invention.

FIG. 1 illustrates a trolley according to embodiment of the present invention indicated generally by reference numeral 100. The trolley 100 may comprise a body 101, wheels 103a, 103b and a support bar 104. The body 101 may comprise handles (not shown) used by a user to control movement of the trolley 100. The trolley 100 may also comprise one or more shelves, such as shelf 102. The body 101 and/or the shelf 102 may be used to store items from an order placed directly on the trolley 100. In other arrangements, the body 101 and/or the one or more shelves 102 may be configured to receive at least one removeable storage such as a 'tote' or box 115a, 115b. As shown in FIG. 1, the shelf 102 may support an upper box 115a and a bottom surface of the body 101 may support a lower box 115b. The at least one box 115a, 115b may be removable from the trolley 100. The at least one box 115a, 115b may be used to store items placed on the trolley 100.

In the illustrated embodiment, the trolley 100 comprises a picker unit 105. The picker unit 105 is arranged to, in use, provide a user of the trolley 100 i.e. a picker, with information about an order comprising one or more items as will be described. The picker unit 105 allows the user to weigh items defined by weight forming part of the order.

The picking unit 105 comprises a weighing balance 110, display 120, communication module 130, memory 140 and processor 150. The picker unit 105 may be defined by a housing, such as a plastic or metal casing. The picker unit 105 may house at least one of the aforementioned components of the trolley 100. For example, the picker unit 105 may house at least one of: the weighing balance 110, display 120, communication module 130, memory 140 and processor 150. It will also be appreciated that some of the components of the trolley 100 may be distributed about the trolley 100. For example, some components of the trolley 100 may be affixed to the body 101, support bar 104 or shelf 102 i.e. in a separate housing. Thus, it will be appreciated that components of the picker unit 105 may be distributed about two or more units supported on the trolley 100.

The picker unit 105 may be moveable with respect to the trolley 100. Advantageously, moving the picker unit 105 allows a user of the trolley 100 to place items in the trolley 100 more easily by improving access to the shelf 102 or the at least one box 115a, 115b for placing items. In addition, moving the picker unit 105 improves the convenience and usability of the trolley 100 for the picker, because the position of the picking unit 105 can be adapted for left or right handed pickers. For example, a left handed picker may prefer to have the picking unit 105 on their left side.

The picker unit 105 may be moveable with respect to the trolley 100. The picker unit 105 may be moveable according to a guided movement along a portion of the trolley 100, such as the support bar 104. In some embodiments, the picker unit 105 is releasably i.e. removably attached to the trolley 100.

The picker unit 105 may comprise an attachment component configured to facilitate the movement of the picker unit 105, such as comprising one or more rollers or gears. It will be appreciated that other attachment components may be used. The portion of the trolley 100 along which the guided movement of the picker unit 105 occurs may be configured to receive the attachment component of the picker unit 105. For example, the support bar 104 may comprise a track configured to receive the attachment component, such as the roller or gear, to facilitate movement of the picker unit 105 along the support bar 104.

The weighing balance 110 is configured to weigh at least one item placed on the weighing balance 110. The weighing balance 110 may be configured to communicate with other components of the trolley 100 as will be described below. The weighing balance 110 may be a weighing balance 110 configured to compensate for errors arising due to tilting of the weighing balance 110, as will be discussed below in relation to FIG. 4. The weighing balance 110 may be tilted as the trolley 100 is moved.

The display 120 is configured to output an indication, such as a visual indication. The display 120 may be considered as a first output device. The display 120 may be a hand-held display such as a mobile device or tablet that is configured to be removably mounted on the trolley. In other embodiments, the display 120 may be mounted on the trolley 100 permanently. For example, the display 120 may be a laptop mounted on the trolley 100. In some embodiments, the weighing balance 110 and the display 120 may be implemented on a common device, such as the picker unit 105

The communication module 130 is configured to receive information from a device or computer system external to the trolley 100, such as a server or router. The communication module 130 may be configured to communicate via wireless communication. The wireless communication may be short-range or long-range communication. For example, the wireless communication may be short-range, such as Wi-Fi, Bluetooth, NFID or RFID, or long-range, such as cellular communications e.g. 3G, 4G or 5G.

The trolley 100 comprises a memory 140 configured to store information. The stored information may be the information received by the communication module 130 or information stored at the time of manufacturing. The memory 140 may be a computer readable storage medium, such as ROM or RAM. The memory 140 may include a computer program 141 comprising computer program instructions 142. The computer program instructions 142 provide the logic and routines that enables the trolley 100 to perform any method disclosed herein, such as the method described below in relation to FIGS. 2A and 2B. The memory 140 may be implemented on a common device with the weighing balance 110, such as the picker unit 105.

The trolley 100 comprises a processor 150. The processor 150 may comprise an output interface 151 via which data and/or commands are output by the processor and an input interface 152 via which data and/or commands are input to the processor 150. Implementation of the processor 150 can be in hardware alone (a circuit), have certain aspects in software including firmware alone or can be a combination of hardware and software (including firmware). The processor 150 may be implemented on a common device with the weighing balance 110, such as the picker unit 105.

The trolley 100 may comprise a user input device 160 configured to receive at least one user input. The user input device may be configured to receive an audio and/or haptic input. The user input device 160 may be a computer mouse, keyboard, touch screen, microphone or any other form of input device. The user input may be interaction with the display using the computer mouse, interaction with the keyboard or touch screen or a vocal input. The input device 160 may be implemented with the display 120 as an I/O device such as a touch screen. The input device 160 may be implemented with the weighing balance 110. For example, both the input device 160 and the weighing balance 110 may be housed within the picker unit 105.

The trolley 100 may also comprise a second output device 170. The second output device 170 may be configured to output an indication, such as a visual, audio and/or haptic output. For example, the second output device 170 may be a speaker. The second output device 170 may be implemented with the weighing balance 110. For example, both the second output device 170 and the weighing balance 110 may be housed within the picker unit 105. The second output device 170 may be housed in the picking unit 105 with the first output device (i.e. display 120) and/or the input device 160.

The trolley 100 may be associated with a means for determining that an item defined by quantity is placed on the trolley 100, such as an item identification means 180. The item identification means 180 may communicate with the processor 150, via the communication module 130, using wireless or wired communication.

The item identification means 180 for determined that an item defined by quantity is placed on the trolley 100 may be a device that is able to provide information to identify an item from the item packaging. For example, the item identification means 180 may be a reader device that is able to read an identification tag attached to or printed on item packaging. The reader device may be an optical code reader, such as a barcode or QR reader or an RFID reader. In some embodiments, the reader device may be an optical sensor, such as a camera.

The item identification means 180 may provide an input to the processor 150 via input interface 152 corresponding to identifying information corresponding to the item defined by quantity placed on the trolley 100. The processor 150 may comprise an item identification module configured to determine the item defined by quantity from the input provided to the input interface 152.

The identifying information corresponding to the item defined by quantity may comprise data capable of directly determining the item defined by quantity. For example, the identifying information from an RFID reader comprises data that can be extracted by the item identification module to directly determine the item defined by quantity. Alternatively, the identifying information corresponding to the item defined by quantity may comprise data that is required to be compared to a database to determine the item defined by quantity. For example, the identifying information from a barcode reader comprises data that is required to be compared to a database of EAN numbers. The database may be stored on the memory 140 or accessed from a device or computer system external to the trolley 100 using the communication module 130.

The item identification means 180 may be a device that is removably mounted on the trolley 100. For example, the item identification means 180 may be removably mounted on the support bar 104 or the picking unit 105. However, it will be appreciated that other arrangements of the item identification means 180 being removably mounted on the trolley 100 will be envisaged. Alternatively, the item identification means 180 may be permanently mounted onto the trolley 100. For example, the item identification means 180 may be housed within the picker unit 105.

Figure 2A:
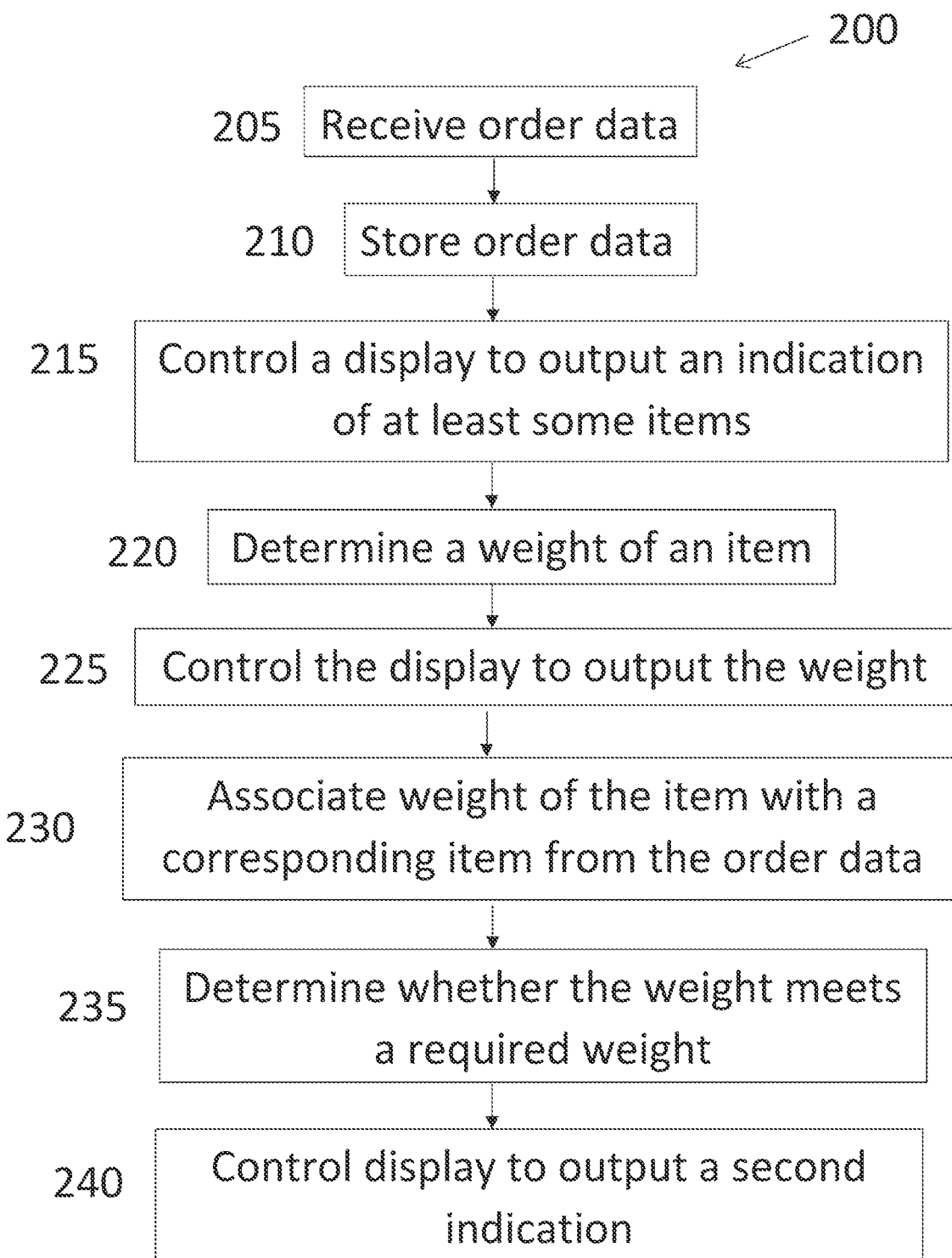
FIG. 2A shows a method according to an embodiment of the present invention.
Figure 2B:
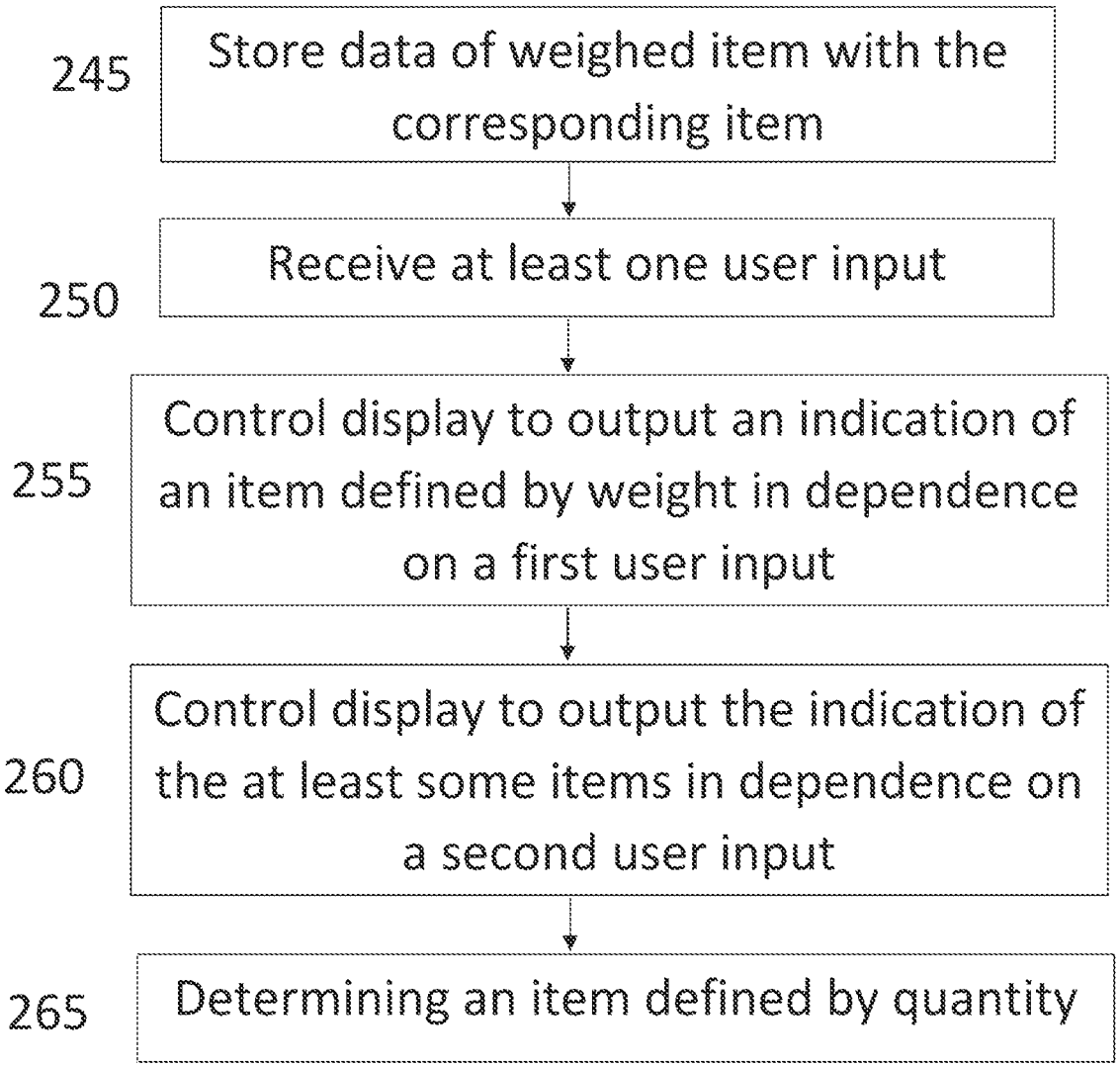
FIG. 2B shows a method according to an embodiment of the present invention.

FIGS. 2A and 2B illustrate a method 200 according to an embodiment of the present invention. The method 200 is a method of determining a weight of an item according to received order information as will be explained. The method 200 may be performed by an apparatus according to an embodiment of the invention, such as the trolley 100 illustrated in FIG. 1. In particular, the processor 150 may perform at least some of the method steps of method 200 described below.

Figure 3A:
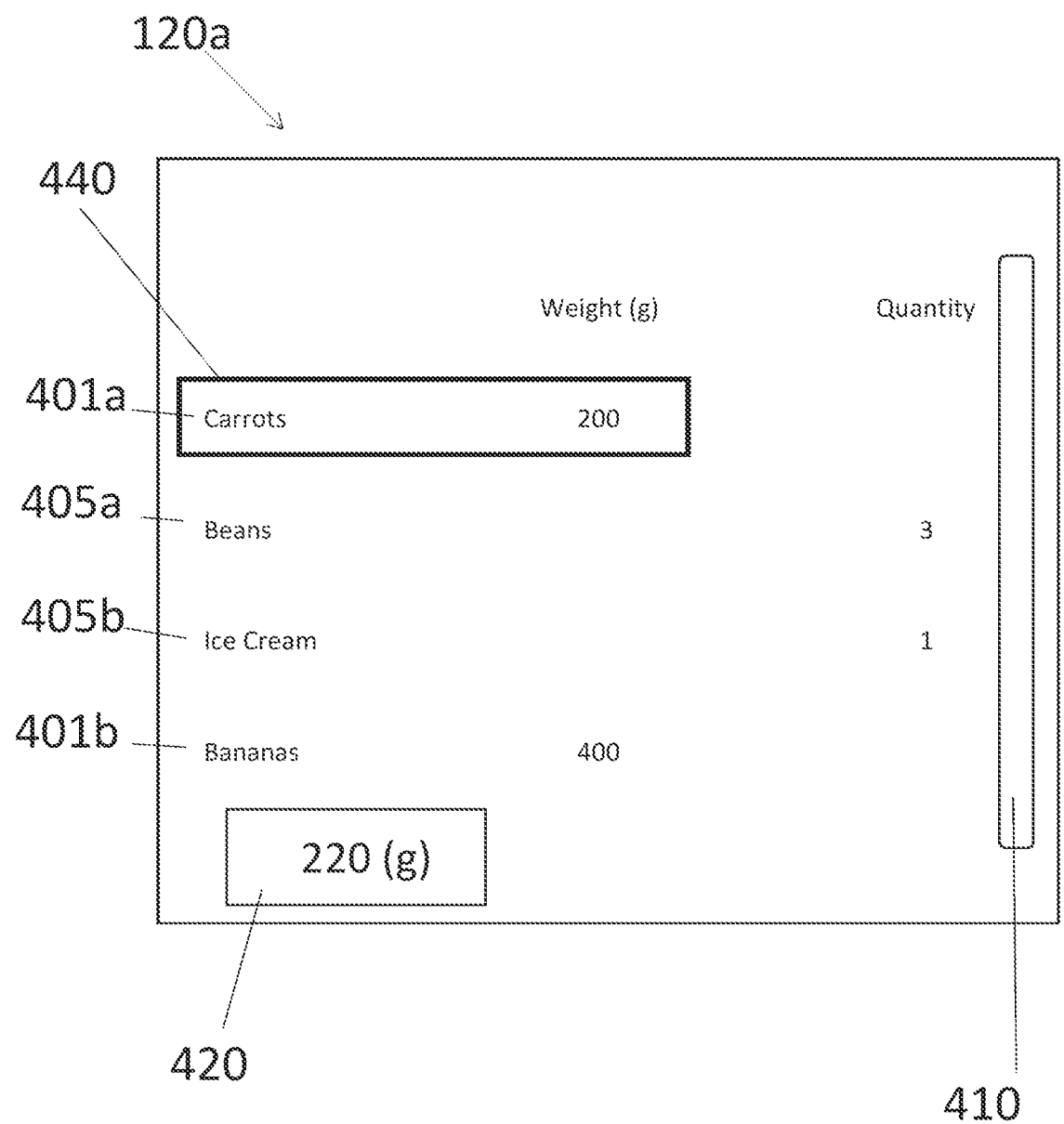
FIG. 3A shows a display according to an embodiment of the present invention.
Figure 3D:
FIG. 3D shows a display according to an embodiment of the present invention.

FIGS. 3A, 3B, 3C and 3D illustrate a screen 120a, 120b, 120c, 120d respectively, that may be output on the display 120 according to an embodiment of the present invention during the method 200. FIGS. 3A and 3B illustrate at least one item defined by weight 401a, 401b which are 'carrots' and 'bananas'. FIGS. 3C and 3D illustrate an item of 'onion' 401c, which is another item defined by weight. FIGS. 3A, 3B and 3C illustrate at least one item defined by quantity 405a, 405b, which are 3 tins of 'beans' and 1 tub of 'ice cream'. FIG. 3D illustrates an item of 'cereal' 405c, which is another item defined by quantity. References will be made to the screens 120a, 120b, 120c and 120d where appropriate to aid in describing the method 200 below.

The method 200 comprises receiving 205 order data indicative of an order comprising one or more items defined by weight. The receiving of the order data is via a communication module, such as communication module 130. For example, the order data may be indicative of an order comprising at least one item defined by weight 401a, 401b, 401c and the at least one item defined by quantity 405a, 405b, 405c.

Method 200 also comprises storing 210 the order data in a memory. The order data may be stored in the memory 140 of trolley 100.

The method 200 comprises controlling 215 a display to output an indication of at least some of the one or more items, as shown in FIG. 3A by the screen 120a. The indication output on the display may be an indication of a single item from the order, or a group of items from the order displayed in a list, such as items 401a, 405a, 401b, 405b.

The order data may comprise only the 4 items shown on the screen 120*a*. The order data may comprise more than 4 items, for example 10 items, in which case the display 120 may display a maximum of 4 items on the screen at one time. The screen 120*a* may shows a scroll bar 410 which is operable to control the display 120 to output an indication of additional items from the order data that are not shown on the screen 120*a* of FIG. 3A. It will be appreciated that the maximum number of items displayed on the screen at one time may be any number of items which is suitable for output on the display 120.

The indication of at least some of the one or more items may comprise text, images or a combination of text and images. For example, each item output on the display may comprise a name of the item and a required 'weight' of the item or required 'quantity' of the item (as shown in screen 120*a*). Optionally, the indication may also comprise an image of the item.

Method step 220 comprises determining a weight of one of the items defined by weight placed on a weighing balance, such as weighing balance 110. The weight may be determined in any unit of measurement of weight, such as grams or kilograms or pounds. For example, the user of the trolley 100, known as a 'picker', who is retrieving items of an order may place an amount of carrots on the weighing balance 110. The processor 150 may determine that the weight of the carrots placed on the weighing balance 110 is '220 g'.

Method step 225 comprises controlling the display 120 to output the determined weight of the at least one item from the weighing balance 110 on the display 120. For example, when the determined weight is 220 g, the processor 150 may control the display 120 to output '220 g'. The display 120 may output the determined weight of the at least one item from the weighing balance 110 in a weight display box 420, which is displayed on the same screen as the indication of at least some of the one or more items, as shown on screen 120*a*. In some examples, the display 120 may output the determined weight of the at least one item from the weighing balance 110 on a 'weighing balance screen' which is a different screen than the indication of at least some of the one or more items.

The method 200 may comprise associating 230 the determined weight of the at least one item from the weighing balance 110 with a corresponding item defined by weight from the order data. Using the above example, in which the 'picker' places 220 g of carrots on the weighing balance 110, the processor 150 may associate the determined weight of '220 g' with 'carrots' which is an item defined by weight of the order. For example, the processor 150 may compare the determined weight with the required weight of each item defined by weight output on the screen 120*b* of FIG. 3B to identify a required weight of an item defined by weight that is closest to the determined weight. Using the example shown in FIG. 3B, the processor 150 may determine that the determined weight of '220 g' is associated with 'carrots' based on the required weight of '200 g'. The processor 150 may associate the determined weight of the at least one item from weighing balance 110 with a corresponding item defined by weight using a different method. For example, the processor 150 may associate the determined weight of the at least one item from weighing balance 110 with a corresponding item defined by weight in dependence on a user input, as explained in more detail below. In this way, an association is made between the at least one item defined by weight placed on the weighing balance 110 and an item defined by weight from the order data.

Furthermore, method step 230 may comprise controlling the display 120 to output the determined weight of '220 g' with an indication of 'carrots' from the indication of the at least some of the one or more items as shown in FIG. 3B on the screen 120*b*.

Additionally, the method 200 may comprise determining pricing information of the at least one item placed on the weighing balance 110. The determining of the pricing information may be based on the association made during method step 230 and described above. The pricing information may be determined from a calculation using the determined weight and price per unit weight information which is known to the skilled person. The price per unit weight information may be obtained from an external database accessed using the communication module 130 or the price per unit weight information may be stored in the memory 140. The pricing information may be output on the display 120.

In some embodiments, determining the pricing information of the at least one item placed on the weighing balance 110 may be performed independently of the association from method step 230. For example, the user may input price per unit weight information without performing the association.

Advantageously, when the pricing information is determined by the trolley 100, there is no need for a label corresponding to the determined weight of the item and pricing information to be printed. Therefore, the trolley 100 provides a cost-saving, time efficient and environmentally friendly alternative to existing technologies.

Additionally, method step 235 may comprise determining whether the determined weight meets a required weight of the corresponding item defined by weight. For example, when the processor 150 associates the determined weight of '220 g' with 'carrots' as the item determined by weight from the order, the processor 150 may determine whether '220 g' meets a required weight of '200 g' included in the order data.

Method step 240 may comprise controlling the display 120 to output a second indication when the determined weight meets a required weight of the corresponding item defined by weight. For example, the second indication 430 is illustrated in FIG. 3B as a 'tick'. The trolley 100 may also comprise a second output device which may output the second indication, such as second output device 170 illustrated in FIG. 1. The second indication may include outputting at least one of: a visual, audio and/or haptic output.

Alternatively or in addition, the second indication may involve: removing the corresponding item defined by weight from the indication of the at least some of the one or more items and/or highlighting an item other than the corresponding item from the indication of the at least some of the one or more items. For example, FIG. 3C illustrates in the screen 120*c* that 'carrots' 401*a* has been removed from the indication of the at least some of the one or more items. Since the order data comprises more than 4 items, the indication of the at least some of the one or more items has been updated to display another item of the order data, 'onion' which has a required weight of 750 g. Although screen 120*c* is not illustrated as including the weight display box 420, it will be appreciated that screen 120*c* could also include the weight display box 420.

Method step 245 may include storing data of the at least one item from the weighing balance 110 with the corresponding item defined by weight from the order data in the memory 140. When the 'picker' weighs more than one item defined by weight, the memory 140 may be configured to store data of each item defined by weight from the weighing balance with a different corresponding item defined by weight from the order data.

Method step 250 may comprise receiving at least one user input via an input device, such as input device 160 illustrated in FIG. 1. The at least one user input could be a touch input or audio input, but other forms of input will be envisaged.

The at least one user input may comprise a first user input. The first user input may be indicative of a user selection of the item defined by weight placed on the weighing balance 110. The user selection may be a selection from the indication of at least some of the one or more items. For example, when the 'picker' places 'carrots' on the weighing balance, the 'picker' may provide a user input to indicate a selection of 'carrots' from the at least some of the one or more items output on the display 120 by touching the indication of 'carrots' on the display 120, using a computer mouse to click the indication of 'carrots' on the display 120 and/or speaking 'carrots' into a microphone. Other forms of user input will be envisaged. In this way, the processor 150 may perform method step 230 of associating the determined weight of the at least one item from weighing balance 110 with a corresponding item defined by weight in dependence on a user input.

The method 200 may comprise controlling 255 the display 120 to output an indication of the item defined by weight corresponding to the user selection in dependence on the first user input. The indication of the item defined by weight corresponding to the user selection may comprise a visual marker 440 as shown in FIG. 3A. In some examples, the indication of the item defined by weight corresponding to the user selection may comprise outputting a page of data of the item defined by weight on the display 120. The page of data may include further details of the item defined by weight, such as nutritional data or price information. Therefore, in dependence on the first user input, the display 120 may switch from outputting the indication of the at least some of the one or more items to outputting the page of data of the item defined by weight corresponding to the first user input.

Furthermore, the indication of the item defined by weight corresponding to the user selection which is output in dependence on the first user input may comprise the weighing balance screen. The weighing balance screen may correspond to the determined weight measured by the weighing balance 110. Therefore, when the item defined by weight is placed on the weighing balance 110, the determined weight of the at least one item from the weighing balance 110 may be output on the display 120 in dependence on the first user input. The page of data may be output on the display 120 at the same time as the weighing balance screen.

The at least one user input may comprise a second user input. The method 200 may comprise controlling 260 the display 120 to output the indication of the at least some of the one or more items in dependence on the second user input. For example, in dependence on the second user input, the display 120 may switch from outputting the page of data to outputting the indication of the at least some of the one or more items, such as the screens 120a, 120, 120c, 120d.

The method 200 may also comprise determining 265 that an item defined by quantity is placed on the trolley 100 using the item identification means 180 illustrated in FIG. 1. The method step 265 may comprise the item identification means 180 providing an input to the processor 150 corresponding to identifying information corresponding to the item defined by quantity. The processor 150 may determine the item defined by quantity using the input from the means 180 using the item identification module, as described above.

Method step 265 may optionally comprise controlling the display 120 to output a third indication in dependence on the identified item defined by quantity. For example, the third indication may include outputting at least one of: a visual, audio and/or haptic output, such as a tick 430 as shown in FIG. 3B. Alternatively or in addition, third indication may involve: removing the corresponding item defined by quantity from the indication of the at least some of the one or more items and/or highlighting an item other than the identified item from the indication of the at least some of the one or more items. For example, FIG. 3D illustrates in screen 120d that 'beans' 405a has been removed from the indication of the at least some of the one or more items. Since the order data comprises more than 5 items, the indication of the at least some of the one or more items has been updated to display another item of the order data, 'cereal' which has a required quantity of 1. Although screen 120d is not illustrated as including the weight display box 420, it will be appreciated that screen 120d could also include the weight display box 420.

It will be appreciated that the numbering and order of the method steps as explained above is not limiting. It will be understood that method steps may be performed in a different order to that shown in FIGS. 2A and 2B and described above according to some embodiments of the invention.

Figure 4:
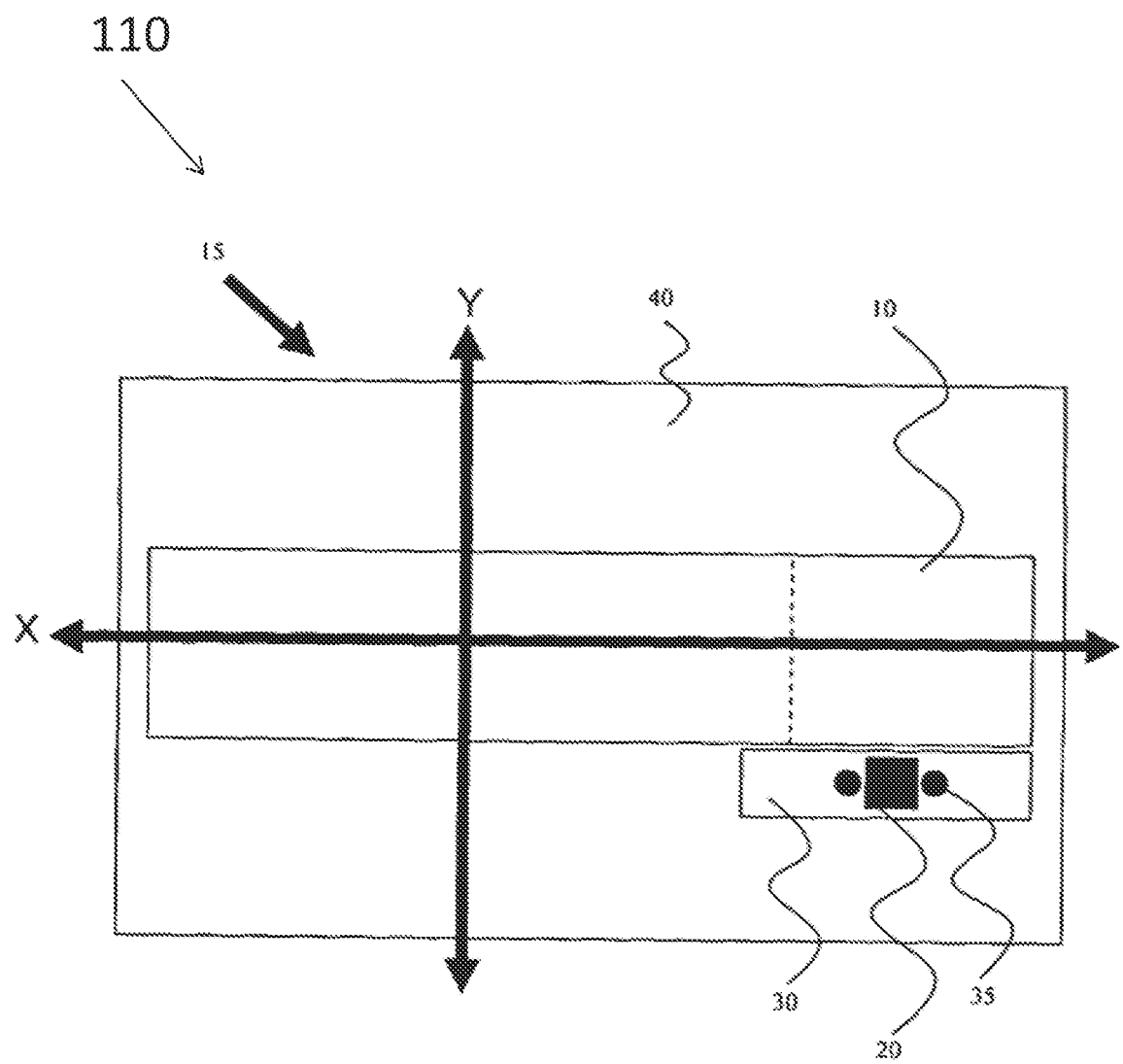
FIG. 4 shows a weighing balance according to an example of the present invention.

As discussed above, the weighing balance 110 may be a weighing balance such as the weighing balance illustrated in FIG. 4 and may comprise a load cell 10 and an inclinometer 20 located in a defined position with respect to the load cell 10. The weighing balance 110 may be configured to tilt compensate for component parts of the load cell 10 output reading that actually vary with tilt and not tilt compensate for the component parts of the output reading that do not vary with tilt. The following references to 'memory device' may be the memory 140.

The weighing balance may use one or more load cells 10 to make the measurement of weight of an applied mass, with the readout typically calibrated in mass units of the applied mass. The applied mass may be an item defined by weight from the order data. For purposes of convenient definition throughout this application the X and Y axes are defined with respect to the plan view of the load cell 10 as shown in FIG. 4 such that: the X axis is defined as the axis running parallel along the usual long dimension of the load cell 10 from the base plate mounting position to the free end of the load cell 10 where a weighing platform and associated fittings are attached; the Y-axis is defined as the axis perpendicular to this X axis, that nominally runs parallel to the short dimension of the load cell 10; each axis being in the horizontal plane.

The inclinometer 20 may be any device operable to give one or more readings associated with the angle or slope of the inclinometer 20 with respect to the horizontal, such as an accelerometer. The output of an accelerometer 20 typically varies with temperature.

The accelerometer 20 may output data values that correspond to inclinations that are accurate to better than ±0.05° in each measurement, more preferably ±0.01°. Typically the accelerometer 20 or other inclinometer is mounted on a PCB 30 (Printed Circuit Board) with associated electronics to operate the accelerometer 20. The accelerometer 20 may be mounted in a pre-defined, substantially fixed positional relationship with respect to the load cell 10 so that the inclination values derived from the accelerometer 20 may be used to measure the inclination of the load cell 10. Preferably, the accelerometer 20 is mounted at the same inclination as the load cell 10 so that a measurement of zero tilt from the accelerometer 20 corresponds to the zero tilt of the load cell 10. The preferred positional relationship aligns one or both axes of acceleration measured by the inclinometer to one or both corresponding axes of the load cell 10 shown in FIG. 4 The accelerometer 20 may measure acceleration along the X and Y axes of the load cell 10.

The weighing balance 110 may be set up such that if the maximum inclination angle is above a certain threshold from the horizontal, the weighing balance 110 will instruct a user via a display, such as display 120, to level the weighing balance 110. Alternatively the weighing balance 110 may automatically adjust feet of the weighing balance 110 to return the weighing balance 110 to the true horizontal level. However below this threshold, the weighing balance 110 applies compensation to reduce the errors arising from the weighing balance 110 being tilted.

Accelerometers may be mounted integrally with or on a load cell 10. The accelerometer 20 may be mounted to the side of a load cell 10 together on a common base plate 40. The base plate 40 is a precision machined single metal plate with two mounting regions on a top surface, one operative to mount the load cell 10 and one operative to mount a PCB 30 with the accelerometer 20.

The combined sub-unit of the accelerometer 20, PCB 30, load cell 10 and base plate 40 is termed the "load cell assembly 15". However a load cell assembly 15 can be any arrangement where the load cell 10 and accelerometer 20 are in a fixed relative position. Preferably the PCB 30 is mounted in close proximity to the region where the load cell 10 is mounted on to the base plate 40, such as immediately adjacent and to the side of the load cell 10 as shown in FIG. 4. This proximal relationship is important as the positional and angular tilt relationships between the accelerometer 20 and load cell 10 must remain as fixed and as constant as possible on the base plate 40 throughout use to ensure that the calibration measurements are correct and continually applicable when the weighing balance is used in normal operation.

Inclinometer and Mounting Calibration

Accelerometers usually have a constant inherent tilt offset present as a result of the accelerometer 20 manufacturing process that may be present when the accelerometer 20 is level to the horizontal and thus may give a constant error in the calculation of tilt angles.

When using an accelerometer 20 to measure the tilt of the load cell 10, other inclination errors may also be present. These errors arise from relative tilt offsets between the accelerometer 20 and load cell 10 resulting from the mounting arrangements between the accelerometer 20 and the load cell 10. These errors can result from mounting errors of the various components (such as accelerometer 20 to the PCB 30, the PCB 30 to the base plate 40 or the load cell 10 to the base plate 40) or machining errors in the base plate 40.

By mounting the accelerometer 20 and load cell 10 into a fixed unit or assembly and calibrating this unit to compensate for internal accelerometer 20 tilt offsets and mounting inclination offsets, an accelerometer 20 may be used with a large inherent tilt offset, such as up to +/−0.11 degrees. Further, calibrating the load cell assembly 15 factors out the mounting errors so the accelerometer 20 does not need to be mounted directly onto or within the load cell 10.

The above mounting errors and inherent accelerometer 20 offsets may be calibrated for by a first calibration step that is made when the load cell assembly 15 is flat to the horizontal to within ±0.05° and calibrates for all initial inclination offsets between the load cell 10 and accelerometer 20. This first calibration step is preferably performed on the load cell assembly 15 before the assembly is mounted into the weighing balance 110 and before the weighing platform is mounted on the load cell 10. The output values from the accelerometer 20 (corresponding to the tilt offset and mounting errors) are read and stored in the memory device. The tilt at which the load cell assembly 15 is measured during this calibration step is taken to be the true 'zero tilt' so that the corresponding X and Y accelerometer 20 offset values can be used for any calibration steps or measurements of applied load.

The load cell output is converted from an analogue signal to a digital signal using an analogue to digital converter (A-O converter) and is filtered by a digital filter to give a weight reading every 100 ms. The filtered data output from the load cell 10 is not direct weight measurements, but numbers of load cell 'counts' that correspond to particular loads directed along the load cell's measurement axis. These filtered load cell output count values can be converted into a weight value and thus a mass value that can be output by the weighing balance 110. For purposes of convenient terminology in this application it is assumed that the load cell outputs are 'count' values that are processed to be converted into weight and/or mass values for output.

The raw data output from the accelerometer 20 corresponding to the X and Y axis tilts are filtered by the same filtering process as the weight filtering and thus the filtered accelerometer readings (correspondingly denoted as Dx and Dy) are output at the same rate as the filtered weight readings. The raw output data from the accelerometer 20 corresponding to the X and Y tilt axes when the load cell 10 is at the true zero horizontal level are denoted as Dxi and Dyi respectively. From these two accelerometer output data values Dxi and Dyi, the acceleration values corresponding to the X and Y axes for a weighing balance at zero tilt can be determined and stored as values Xoff and Yoff respectively. The values Xoff and Yoff are preferably electronically stored in the memory device. The zero tilt offset values Xoff and Yoff can be used to determine the relative tilt of the load cell 10 in subsequent measurement or calibration.

The accelerometers typically used have a digital offset constant (Dk) and a sensitivity constant (Sk) inherent to the accelerometer 20. Dk and Sk are used in equations 1 and 2 below to give the acceleration readings Xoff and Yoff for the respective X and Y axes.

$$Xoff = \frac{(Dxi - Dk)}{Sk} \qquad \text{Equation 1}$$

$$Yoff = \frac{(Dyi - Dk)}{Sk} \qquad \text{Equation 2}$$

The first inclination offset calibration step can equally be performed on a load cell assembly 15 mounted in the weighing balance 110. By having the load cell 10 on a single precision machined base plate 40 where the top surface mounting regions are known to be flat and parallel to the bottom surface of the base plate 40 to within +/−0.05 degrees, the load cell 10 is known to be on a flat horizontal to within +/−0.1 degrees when the base plate 40 is located on a level platform which is accurate to +/−0.05 degrees to the horizontal.

Once the load cell 10 has been calibrated for inclination offsets as described above, the load cell assembly 15 may be mounted into a weighing balance casing and a weighing platform or container and associated fixings may be attached to the free end of the load cell 10. The load cell 10 may, with this initial inclination offset calibration accomplished, make measurements of applied loads that compensate for the errors arising from the tilting of the applied load when the weighing balance 110 is tilted off axis from the horizontal.

When the load cell 10 (and accelerometer 20) is used subsequent to the initial inclination calibration, the acceleration output values Xa and Ya corresponding to the tilt along the X and Y axes respectively may be derived from the raw X and Y data output from the accelerometer 20 Dx and Dy using equations 3 and 4 below.

$$Xa = \frac{(Dx - Dk)}{Sk} \qquad \text{Equation 3}$$

$$Ya = \frac{(Dy - Dk)}{Sk} \qquad \text{Equation 4}$$

The angles of tilt Xb and Yb along the X and Y axes respectively may be derived from the acceleration values Xa and Ya and the initial X and Y offset accelerations Xoff and Yoff by using equations 5 and 6.

$$Xb = \arcsin(Xa - Xoff) \qquad \text{Equation 5}$$

$$Xc = Xb - Tc \qquad \text{Equation 5a}$$

$$Yb = \arcsin(Ya - Yoff) \qquad \text{Equation 6}$$

$$Yc = Yb - Tc \qquad \text{Equation 6a}$$

The accelerometer 20 is also compensated for temperature whereby the error in angle at a particular temperature is termed Tc. Temperature compensated tilt angles Xc and Yc along the X and Y axes respectively may be calculated by subtracting the temperature dependent error in angle Tc from the tilt angles Xb and Yb as described in equations 5a and 6a.

The measurement errors present when an applied load is measured by a tilted weighing balance 110 may be corrected by a single combined tilt Td that takes into account both of the temperature compensated tilt angles Xc and Yc as described by equation 7 below.

The combined tilt Td can be used with equation 8 to compute a tilt compensation factor Tk that can be applied to correct the measurement errors in load cell readings.

$$Td = \sqrt{(Xc^2 + Yc^2)} \qquad \text{Equation 7}$$

$$Tk = \cosine(Td) \qquad \text{Equation 8}$$

Calibrating for Tilt Dependent Deadweight and Other Load Cell Signal Offsets

Independently of the initial calibration to compensate for: (i) the errors in weight resulting from an applied load being at an angle when the load cell 10 is tilted off the horizontal; and, (ii) the temperature dependence of the accelerometer 20; the deadweight arising from the dead load of the weighing balance 110 must also be properly calibrated for tilt dependent error.

The output reading or 'counts' value output from the load cell 10 when no load is applied is a combination of two main sources: 1) The deadweight of the dead-load; and 2) Other sources such as substantially constant offsets from electronics built into or associated with the load cell 10. In this example, the 'other sources' result from the A-D converter and are hereinafter referred to as 'electronic offsets'.

The measured deadweight of the dead-load of the weighing balance 110 also varies with the cosine of the combined tilt angle. However the electronic offset is substantially a constant that typically does not vary with tilt. Thus part of the total load cell output value is associated with weight and varies with the inclination of the load cell 10 according to a first inclination relationship whereas one or more other parts of the total load cell output value vary with the inclination of the load cell 10 according to a second inclination relationship that are different to the first inclination relationship. If a weighing balance 110 is tilted with no applied load, the total output reading from the load cell 10 will vary with tilt by being the sum of a tilt variable dead weight and a constant electronic offset.

Therefore taking the output count reading derived from the load cell 10 when no load is applied as an absolute measurement of deadweight is incorrect because this reading includes the 'electronic offsets' which do not equate to the dead-load. This 'electronic offset' addition to the deadweight becomes a problem when pre-calibrating the weighing balance 110 for deadweight.

When a weighing balance 110 is used to measure the weight of an applied load, such as the item defined by weight, the output reading from the load cell 10 is a combination of: the weight of the applied load (variable with load cell tilt), the weight of the dead-load of the weighing balance 110 (variable with load cell tilt), and the constant electronic offsets that are present.

To obtain more accurate measured weight values of an applied load when a weighing balance 110 is tilted at an angle, the output reading from the unloaded weighing balance 110 must be compensated for in the output reading from the loaded weighing balance 110 by taking into account, and modifying if necessary, the portions of the loaded and unloaded readings that are variable with tilt according to a first relationship and those that are not variable with tilt, or variable with tilt according to a second relationship. When calculating a modified value of the load cell output counts by applying tilt compensation, the correct value of electronic offset is subtracted from the tilt compensated count value of the load cell 10 when measuring the applied load. The method comprises predetermining the electronic offset for the weighing balance 110, storing this value and subsequently using and reusing it when making any further load cell measurements.

The weighing balance 110 may be pre calibrated by measuring with the load cell 10 in a first position a first load cell output value corresponding to at least a first weight value and a first offset value. The first weight value varies with the inclination of the load cell 10 according to a first inclination relationship. The inclination value associated with the tilt of the load cell 10 at the first position may be measured with the inclinometer 20. The method measures with the load cell 10 in a second position a second load cell output value corresponding to at least a second weight value and a second offset value. The second position at a different inclination than the first position however the second weight value still varies with the inclination of the load cell 10 according to the first inclination relationship. Again, the inclinometer 20 measures a second inclination value associated with the tilt of the load cell 10 at the second position. The first value corresponding to at least the first weight value and the first offset value, and the second value corresponding to at least the second weight value and the first offset value are compared. A parameter (e.g. an 'electronic offset') based upon a second inclination relationship between the offset values and load cell inclination is derived.

This method is applied by determining the electronic offset', by reading at least two load cell measurements at different tilt angles, denoted below as output count values M1 and M2. The at least two measurements are taken with the same amount of applied load, which in the example is zero. Because at the two different tilt angles, the deadweight will change in a known cosine relationship, but the electronic offset remains constant, comparison of M1 and M2 will allow the determination of the number of counts associated with the electronic offset. Thus, the electronic offset can be removed from a measurement prior to any tilt compensation being applied.

The first measurement (M1) of deadweight and electronic offset is taken with no applied load when the load cell 10 is at zero tilt to the horizontal. This value is known as 'zerovalue' and is stored for use in other calibration steps described later. The second measurement (M2) is preferably taken when the load cell 10 is inclined solely along one axis (X or Y) to the maximum expected tilt that the weighing balance 110 will be designed to correct for in normal operation. When inclined to the second inclination angle along the one axis, the other perpendicular axis is kept substantially level to within +/−0.1 degrees of the horizontal, but measurements M1 and M2 can be taken with any two different combinations of X and Y tilt. With the deadweight and electronic offset measured at 0 and 5 degree inclinations to the horizontal, the count component (DW) corresponding to dead load can be calculated using equation 9.

$$DW = \frac{(M1 - M2)}{(1 - \cosine(Td))} \qquad \text{Equation 9}$$

Because in the example, measurement M1 was taken with both axes level to the horizontal to within ±0.1°, M1 can be taken as the value of constant offset and maximum value of deadweight, thus the constant value electronic offset in the count values, Eoff, can be calculated using equation 10. This value may be stored in the memory device.

$$Eoff = M1 - DW \qquad \text{Equation 10}$$

The above tilt dependent deadweight calibration measurement is conducted once the load cell assembly 15 has been assembled into the weighing balance 110 with the weighing platform fixed to a free end of the load cell 10. By referring to the accelerometer 20 output values, hence tilt angles, derived from the accelerometer 20, the weighing balance 110 is firstly levelled to within +/−0.1° to the horizontal, which is typically done by adjusting the feet. No applied load is placed upon the weighing platform. Measurement M1 is recorded at the first inclination angle of 0 degrees to the horizontal. The weighing balance 110 is tilted to be at the second inclination angle and the measurement M2 stored.

Once the constant electronic offset 'Eoff' is calculated and stored in the weighing balance 110 it can be used in more accurately measuring the weight of an applied load on a tilted weighing balance 110. The load cell output count reading from placing the applied load on the weighing balance 110 is Wa, which corresponds to the applied load, the dead-load and the electronic offset. With Eoff already known and stored, the weighing balance 110 can correctly calculate the true zero tilt weight of the applied load. This is done by subtracting the pre-calculated stored value of Eoff from the total load cell output counts Wa to leave only the load cell output counts corresponding to the dead-load and applied load, both of which have a cosine dependent relationship with tilt. The tilt compensation is applied to give a value (Wb) representing the correct 'zero-tilt' count value of dead-load and applied load.

$$Wb = \frac{(Wa - Eoff)}{Tk} \qquad \text{Equation 11}$$

Obtaining an accurate tilt corrected weight value of the applied load can be calculated according to equation 12 by subtracting off the previously calculated zero-level deadweight from Wb. Alternatively, the combined tilt compensated deadload and applied load value (Wb) can be used as a term in a weight calculation that further compensates for other weighing errors as described below.

Counts corresponding to applied load weight=$Wb-DW$ \qquad Equation 12

Calibration for Residual Load Cell Error

When a weighing balance is tilted, errors in the measured weight value of an applied load still occur even when compensating for: the errors in weight resulting from an applied mass being at an angle to the load cell measurement axis when the load cell 10 is tilted off the horizontal; the temperature dependence of the accelerometer 20; and offsets that remain constant when compensating for the tilt dependence of the deadweight of the dead-load.

For purposes of nomenclature in this application, these extra errors in the measured weight are termed 'residual errors' and have been found to be due to the effects that tilt has on the internal workings and components of the load cell 10. When a load is applied to the weighing balance 110, the act of applying weight causes distortion to the load cell 10. When this is performed at an angle, further bending moments in the load cell 10 cause an error in the output weight reading that is not compensated for using the tilt correction methods described above in the previous section.

These residual weighing errors increase with increasing tilt and increasing load wherein the residual error about the Y axis is proportional to the product of applied load and tilt whilst the residual error about the X axis is proportional to the product of the tilt and the square of the applied load as described by the equations 13 and 14 below.

Y residual error∝(applied load)×(tilt) \qquad Equation 13

X residual error∝(applied load)2×(tilt) \qquad Equation 14

Therefore, there is provided a method of pre-calibrating a weighing balance to compensate for these residual errors. This is achieved by making one or more load cell measurements of one or more masses at a tilt, compensating for the tilt according to a known inclination relationship, noting (recording) the residual error existing after the initial inclination compensation and calculating one or more error compensation parameters that can be used in subsequent measurements using the load cell 10. A first value associated with a weight of a first mass at a first inclination value is provided to or by the weighing balance 110, which is preferably when the first inclination value is zero i.e. level with the horizontal. This first value may be previously known or may be derived by the weighing balance 110 by making a first measurement made with the load cell 10 at a substantially horizontal level. The first measurement outputs a first value associated with the weight of a first mass, which may be an applied load on the weighing balance 110 or the dead-load of the weighing balance 110 itself.

It is required that the first mass is measured when the load cell 10 is at a second inclination from the horizontal so that a second value associated with a weight of the first mass is recorded. The second inclination from the horizontal that corresponds to the second value is different to the first inclination associated with the first value. Whilst at this second inclination, the inclinometer measures a second inclination value. The second weight value is modified in accordance with at least a known inclination relationship and the second inclination value is modified to a value that corresponds to the first inclination level. This known inclination relationship is typically a cosine relationship. The calibration method compares the first weight value and the modified second weight value and calculates an error parameter based at least upon the results of the comparison; and an error relationship (such as described in equation 13 and 14) between weight, and load cell inclination. When calibrating for residual load cell errors according to equation 14, another mass different to the first mass is measured at the horizontal and at a tilt and used to calculate the error parameters.

The method compensates for the residual errors by: a) calculating a correction factor (Yk) for the residual errors in the Y axis, and; b) calculating two correction factors (Xk1, Xk2) for the residual errors in the X axis; c) storing these correction factor values and, d) using them in subsequent measurements of applied load.

In the example, two error values are calculated and summed to take into account the quadratic nature of the load cell bending moment errors resulting from any X axis tilt. One error value is calculated to take into account the linear nature of the load cell bending moment errors resulting from any Y axis tilt.

The example uses these correction factors to calculate residual error values in each axis. The error values are subtracted from the count value Wb described in equation 11 to obtain a count value corresponding to the weight of the dead-load and applied load that is correctly compensated for tilt, having removed any constant offsets that should not be tilt corrected; and compensated for residual errors.

This is achieved by calculating a residual error compensated weight count We from the count value Wb as detailed in equation 15.

$$Wc = Wb - [(Wb^2 \times Xc \times Xk2) + (Wb \times Xc \times Xk1) + (Wb \times Yc \times Yk)] \qquad \text{Eq. 15}$$

The example obtains the correction factors by making: one or more calibration measurements to calculate the correction factor in the Y axis: and at least two calibration measurements to calculate the correction factors in the X axis. The two measurements required to calculate the X correction factors Xk1 and Xk2 are due to having to solve quadratic equations because of the quadratic relationship between load and residual error. These calibration measurements for determining the X and/or Y residual error correction factors are termed 'secondary calibration measurements' for purposes of this description. The secondary calibration measurements for the Y axis form one set, the secondary calibration measurements for the X axis form another set. Each set of secondary calibration measurements involve placing one or more known loads on the weighing balance 110 when the weighing balance 110 is tilted about the Y axis and two or more known loads on the weighing balance 110 when the weighing balance 110 is tilted about the X axis. A known load is an applied load that has a previously and accurately measured known weight.

In order to calculate the correction factors Yk, Xk1 and Xk2 a reference value of load cell counts is required for each of the known loads. The linear relationship between the number of counts output from the load cell 10 with respect to increasing applied load is calculated. By knowing the load cell counts corresponding to two 'zero-tilt' measurements of applied load, the linear relationship between counts and applied load can be determined. Once the linear relationship is determined, the number of counts of any arbitrary applied load can be calculated using this relationship.

The example determines this linear relationship by calculating a 'span value' according to equation 16, which is the difference between the counts measured by the load cell 110 at zero tilt with no applied load (zerovalue) and the counts measured by the load cell 10 at zero tilt with the applied load corresponding to the maximum load that the load cell 10 is to nominally measure in practice. Because the measurements to calculate the span value are taken when the weighing balance 110 is flat to the horizontal to within +/−0.1 degrees, the span value thus gives the correct number of counts that corresponds to the maximum known applied load in the secondary calibrations measurements, as errors are not present from the effects of tilting. The span value is stored for the maximum known load to be placed on the weighing balance 110 in the secondary calibrations. The correct (zero tilt) number of counts for any other smaller known load applied to the weighing balance 110 can be calculated simply by dividing the span value to the appropriate fraction corresponding to what fraction the smaller known load is compared to the maximum known load.

$$\text{spanvalue} = (\text{counts at maximum known load}, 0 \text{ tilt}) - (\text{counts at zero load}, 0 \text{ tilt}) \qquad \text{Equation 16}$$

In the example, one secondary calibration measurement is used to determine Yk as shown in Equation 17. The weighing balance 110 is tilted to 5 degrees in the Y axis and kept level in the X axis to ±0.10. The full (maximum) known load is applied onto the weighing balance 110, for example 6 kg (for a 6 kg balance). The actual value of angular tilt Yc in the Y axis measured by the accelerometer 20 is recorded along with the load cell count value for that measurement. A value of tilt compensated weight of the applied load plus deadload (Wb) is calculated according to equation 11.

$$Yk = \frac{(Wb - \text{zerovalue} - \text{spanvalue})}{[(Wb - \text{Eoff}) \times Yc]} \qquad \text{Equation 17}$$

Another similar secondary calibration measurement set is performed to determine Xk1 and Xk2. The smaller of the two loads in the secondary calibration measurements required to determine Xk1 and Xk2 should be approximately ⅓ of the maximum applied load because at this value the residual errors resulting from tilt start to become significant.

The weighing balance 110 is tilted to 5 degrees in the X axis and kept level in the Y axis to ±0.1°. The full (maximum) known load is applied onto the weighing balance 110, for example 6 kg (for a 6 kg balance). The actual value of angular tilt Xc in the X axis measured by the accelerometer 20 is recorded along with the load count value for that measurement. A value of tilt compensated weight of the applied load plus dead-load (Wb) is calculated according to equation 11. The same secondary calibration step is repeated for a ⅓ known load (2 kg) when the weighing balance 110 is tilted in the X-axis to 5 degrees. The correction factors Xk1 and Xk2 are calculated using equations 18-25. The terms E1, FB1 and FA1 are simply values representing the results of intermediate calculation steps of Xk1 and Xk2 where Wb corresponds to the calibration step when the full (maximum) known load is applied onto the weighing balance 110. The terms E⅓, FB2 and FA2 are simply values representing the results of intermediate calculation steps of Xk1 and Xk2 where Wb corresponds to the secondary calibration measurement when the smaller known load is applied onto the weighing balance 110 (which in the example is ⅓ of the full known load).

$$E1 = (W_b - zerovalue) - spanvalue \qquad \text{Equation 18}$$

$$FB1 = \frac{(W_b - Eoff)}{Xc} \qquad \text{Equation 19}$$

$$FA1 = FB1(Wb - Eoff) \qquad \text{Equation 20}$$

$$E_{1/3} = (W_b - zerovalue) - (spanvalue/3) \qquad \text{Eq. 21}$$

$$FB2 = \frac{(W_b - Eoff)}{Xc} \qquad \text{Equation 22}$$

$$FA2 = FB2(Wb - Eoff) \qquad \text{Equation 23}$$

$$Xk1 = \frac{\left[\left(E1 \times \frac{FA2}{FA1}\right) - E_{1/3}\right]}{\left[\left(FB1 \times \frac{FA2}{FA1}\right) - FB2\right]} \qquad \text{Equation 24}$$

$$Xk2 = \frac{[E1 - (FB1 \times Xk1)]}{FA1} \qquad \text{Equation 25}$$

A degree of crosstalk exists between the residual load cell errors in the X and Y axes. When the weighing balance is tilted about one axis but kept approximately level in the other, as described for the secondary measurements, some or all of the factors that give rise to the residual errors in the tilted axis may also produce residual errors in the orthogonal axis. This crosstalk may arise, for example, from crosstalk within the accelerometer 20 and/or crosstalk within the load cell 10. Additionally, because the level axis is only level to within ±0.1° of the horizontal, there may still be up to ±0.1° of tilt in the orthogonal axis contributing to the overall residual error in a secondary calibration measurement.

It has therefore been found that the correction factor/s to compensate for the residual errors in one axis can be determined more accurately when calculated using the compensation factors previously derived for the residual errors in the orthogonal axis. It has also been found that the compensation factors in one or more axes may also be required to be re-calculated one, or a successive number of times to iteratively improve the accuracy of the compensation factor/s due to the effects of the crosstalk.

The example corrects for the residual error cross talk by using the term Wc to replace the term Wb in equations 17-23. For the initial secondary calibration measurement where none of the correction factors Yk, Xk1 or Xk2 are known, all three correction factors (Xk1, Xk2, Yk) are set to zero. After the initial secondary calibration measurement set for one axis is completed, the correction factor/s for that particular axis are calculated as described above and stored. In the next secondary calibration measurement set for the orthogonal axis to the initial set, the correction factors are determined by using the value of Wc calculated with the previously determined correction factors for the orthogonal axis, instead of Wb.

The secondary calibration measurements may be repeated alternately, where each time, the new values of the correction factors for that axis are calculated using an improved, more accurate value of the correction factors for the orthogonal axis. However, sufficient accuracy of the compensation factors can be obtained by performing an initial set of secondary calibration measurements thus deriving correction factors for a first axis, using those initial factors in deriving the correction factors for the orthogonal second axis and repeating the secondary calibration set for the first axis again using the correction factors calculated for the second axis.

Once all secondary calibration measurements have been completed, the calculated values of Xk1, Xk2 and Yk are stored the memory device. Thus, the following values are stored from all the previous calibration steps as described in table 1.

TABLE 1

Calibration values stored in the example.

| Term | Explanation of the term |
| --- | --- |
| Xoff | Value of acceleration from the accelerometer 20 along the X axis when the load cell 10 is flat to the horizontal to within +/−0.1 degrees in each axis. |
| Yoff | Value of acceleration from the accelerometer 20 along the Y axis when the load cell 10 is flat to the horizontal to within +/−0.1 degrees in each axis. |
| zerovalue | Filtered load cell count value for the scale flat to within +/−0.1 degrees in each axis, no applied load |
| Eoff | Filtered load cell count value for any load cell constant offset not due from the dead-load or an applied load. |
| spanvalue | Filtered load cell count value for the scale flat to within +/−0.1 degrees in each axis, no applied load |
| Xk1 | Correction factor used to compensate for the residual tilt dependent load cell errors for the component of scale tilt in the X axis. |
| Xk2 | Correction factor used to compensate for the residual tilt dependent load cell errors for the component of scale tilt in the X axis. |
| Yk | Correction factor used to compensate for the residual tilt dependent load cell errors for the component of scale tilt in the Y axis. |

Order of Steps to Compensate for Tilt when the Weighing Balance is in Normal Use Once the load cell assembly 15 and the weighing balance 110 have been calibrated, the calibrated weighing balance 110 is able to take a load cell reading when an unknown applied load is placed on the weighing balance 110 and compensate for: errors in weight resulting from an applied load being at an angle when the load cell 10 is tilted off the horizontal; temperature dependence of the accelerometer 20; constant offsets when compensating for the tilt dependence of the deadweight of the dead-load; residual tilt dependent load cell errors resulting from effects such as additional load cell bending moments or strain gauge misalignment.

The residual errors are compensated for by using the calculated error parameters (such as Xk1, Xk2 and Yk) to obtain accurate tilt compensated weight and/or mass values. This is achieved by measuring a first value with the load cell 10 corresponding to at least a weight value wherein the weight value varies with the inclination of the load cell 10 according to a first inclination relationship. Whilst the load cell 10 is in the same position, the inclinometer measures an inclination value associated with the inclination of the load cell 10 this is preferably done simultaneously with the measuring of the first load cell value. Using the measured inclination value, the measured weight value is modified in accordance with the first inclination relationship to compensate for the tilt dependence of measured weight and also further modified using the error parameter to compensate for the residual errors.

The weighing balance 110 compensates for these errors once a measurement Wa is taken by the load cell 10 for an unknown load by:
  a) recording the accelerometer 20 values from the accelerometer 20 and computing the acceleration values Xa and Ya in each load cell axis according to equations 3 and 4;
  b) calculating the tilt angles Xb and Yb in each load cell axis according to equations 5 and 6;
  c) applying temperature compensation to the tilt angles Xb and Yb to give Xc and Yc according to equations 5a and 6a;
  d) removing any constant electronic offsets 'Eoff' from the initial load cell output count Wa and compensating for tilt using equation 11 to give the tilt compensated count value (Wb) of the weight of the unknown load plus the dead-load;
  e) compensating the tilt compensated weight count of the dead-load plus applied load (Wb) for the tilt dependent residual errors in the load cell 10 using equation 15 to give We;
  f) optionally applying gravity compensation to We to give the gravity compensated weight value of load plus dead-load Wd;
  g) removing the deadweight of the dead-load from Wd to give the weight of the unknown applied load using equation 26.

$$We = Wd - (\text{zerovalue} - Eoff) \quad \text{Equation 26}$$

The method may also apply gravity compensation to take into account the location dependent nature of gravity. Gravity compensation factors 'Gf' for the calibration site and 'Gs' for the site of use are stored, preferably in the load cell assembly 15, and applied to the value We according to the equation 27 to calculate the gravity compensated value Wd of load and dead-load. Equally, gravity compensation may be applied to the weight value of the unknown applied load after removal of the deadweight of the dead-load.

$$Wd = \frac{(Wc \times Gf)}{Gs} \quad \text{Equation 27}$$

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A trolley, comprising:
   a weighing balance configured to weigh at least one item placed on the weighing balance;
   a display;
   a picker unit attached to and moveable with respect to the trolley, wherein the picker unit comprises the weighing balance and the display;
   a communication module configured to receive order data indicative of an order comprising one or more items, wherein at least one of the items is defined by weight;
   a memory configured to store the order data;
   a processor configured to:
     control the display to output an indication of at least some of the one or more items,
       determine a weight of one of the items defined by weight placed on the weighing balance, and
       control the display to output the determined weight of the at least one item from the weighing balance on the display.

2. The trolley of claim 1, further comprising a support bar, wherein the picker unit is moveable according to a guided movement along the support bar.

3. The trolley of claim 1, wherein the processor is configured to associate the determined weight of the at least one item from the weighing balance with a corresponding item defined by weight from the order data.

4. The trolley of claim 3, wherein the processor is configured to determine whether the determined weight meets a required weight of the corresponding item defined by weight.

5. The trolley of claim 4, wherein the processor is configured to control the display to output a second indication when the determined weight meets the required weight of the corresponding item defined by weight.

6. The trolley of claim 3, wherein the memory is configured to store data of the at least one item from the weighing balance with the corresponding item defined by weight from the order data.

7. The trolley of claim 1, further comprising an input device configured to receive at least one user input, wherein the at least one user input comprises a first user input indicative of a user selection of the item defined by weight placed on the weighing balance and the processor is configured to control the display to output an indication of the item defined by weight corresponding to the user selection in dependence on the first user input.

8. The trolley of claim 7, wherein the at least one user input comprises a second user input and the processor is configured to control the display to output the indication of the at least some of the one or more items in dependence on the second user input.

9. The trolley of claim 1, wherein the trolley is associated with a means for determining that an item defined by quantity is placed on the trolley.

10. The trolley of claim 1, wherein the display is mounted on the trolley and the weighing balance and the display are implemented on a common device.

11. A method comprising:
- receiving, by a communication module, order data indicative of an order comprising one or more items, wherein at least one of the items is defined by weight;
- storing the order data in a memory;
- controlling a display to output an indication of at least some of the one or more items;
- determining a weight of one of the items defined by weight placed on a weighing balance; and
- controlling the display to output the determined weight of the at least one item from the weighing balance on the display,
- wherein a picker unit comprising the display and the weighting balance is attached to and moveable with respect to a trolley, the weighing balance configured to weigh at least one item placed on the weighing balance.

12. The method of claim 11, wherein the trolley comprises a support bar, and wherein the picker unit is moveable according to a guided movement along the support bar.

13. The method of claim 11, comprising associating the determined weight of the at least one item from the weighing balance with a corresponding item defined by weight from the order data.

14. The method of claim 13, comprising determining whether the determined weight meets a required weight of the corresponding item.

15. The trolley of claim 14, comprising controlling the display to output a second indication when the determined weight meets the required weight of the corresponding item.

16. The trolley of claim 13, comprising storing, in the memory, data of the at least one item from the weighing balance with the corresponding item defined by weight from the order data.

17. The method of claim 11, comprising receiving at least one user input via an input device.

18. The method of claim 17, wherein the at least one user input comprises a first user input indicative of a user selection of the item defined by weight placed on the weighing balance and the method comprises controlling the display to output an indication of the item defined by weight corresponding to the user selection in dependence on the first user input.

19. The method of claim 17, wherein the at least one user input comprises a second user input and the method comprises controlling the display to output the indication of the at least some of the one or more items in dependence on the second user input.

20. A trolley, comprising:
- a weighing balance mounted over a body of the trolley and configured to weigh at least one item placed on the weighing balance, wherein the body of the trolley is configured to store the at least one item;
- a display;
- a communication module configured to receive order data indicative of an order comprising one or more items, wherein at least one of the items is defined by weight;
- a memory configured to store the order data;
- a processor configured to:
  - control the display to output an indication of at least some of the one or more items,
  - determine a weight of one of the items defined by weight placed on the weighing balance, and
  - control the display to output the determined weight of the at least one item from the weighing balance on the display.

* * * * *